United States Patent
Czaniera

(10) Patent No.: US 10,126,538 B2
(45) Date of Patent: Nov. 13, 2018

(54) OPTICAL DEVICE FOR GENERATING WITH THREE-DIMENSIONAL EFFECT

(71) Applicant: ATMOS MedizinTechnik GmbH & Co. KG, Lenzkirch (DE)

(72) Inventor: Jürgen Czaniera, Bonndorf (DE)

(73) Assignee: ATMOS MedizinTechnik GmbH & Co. KG, Lenzkirch (DE)

( * ) Notice: Subject to any disclaimer, the term of this patent is extended or adjusted under 35 U.S.C. 154(b) by 220 days.

(21) Appl. No.: 15/314,026

(22) PCT Filed: May 22, 2015

(86) PCT No.: PCT/EP2015/061448
§ 371 (c)(1),
(2) Date: Nov. 25, 2016

(87) PCT Pub. No.: WO2015/181095
PCT Pub. Date: Dec. 3, 2015

(65) Prior Publication Data
US 2017/0199365 A1  Jul. 13, 2017

(30) Foreign Application Priority Data
May 27, 2014  (DE) .................. 10 2014 107 432

(51) Int. Cl.
*G02B 21/22* (2006.01)
*G02B 5/00* (2006.01)
(Continued)

(52) U.S. Cl.
CPC .............. *G02B 21/22* (2013.01); *G02B 5/005* (2013.01); *G02B 21/025* (2013.01); *G02B 27/0075* (2013.01)

(58) Field of Classification Search
None
See application file for complete search history.

(56) References Cited

U.S. PATENT DOCUMENTS

| | | |
|---|---|---|
| 6,348,994 B1 | 2/2002 | Geier et al. |
| 2005/0168809 A1 | 8/2005 | Moller et al. |

(Continued)

FOREIGN PATENT DOCUMENTS

| | | |
|---|---|---|
| DE | 102004006066 | 8/2005 |
| DE | 102006036300 | 11/2007 |

(Continued)

OTHER PUBLICATIONS

Patent Cooperation Treaty, "International Search Report" and translation thereof, issued in International Application No. PCT/EP2015/061448, by European Searching Authority, document of 7 pages, dated Aug. 14, 2015.

*Primary Examiner* — Derek S Chapel
(74) *Attorney, Agent, or Firm* — Akerman LLP; Peter A. Chiabotti

(57) ABSTRACT

An optical device for generating images with a three-dimensional effect is disclosed. The device can include a first observation channel, a second observation channel that can be present simultaneously, or alternated in intervals, with the first observation channel. The device can also include a first diaphragm arranged in the first observation channel and having a first aperture. The first aperture can include a first semimajor axis, a first semiminor axis perpendicular to the first semimajor axis such that an extension of the first aperture in a direction of the first semimajor axis is greater than an extension of the first aperture in a direction of the first semiminor axis. Further, the device can include a second diaphragm arranged in the second observation channel and having a second aperture, that can have a second semimajor axis and a second semiminor axis.

12 Claims, 12 Drawing Sheets

(51) Int. Cl.
  *G02B 27/00*   (2006.01)
  *G02B 21/02*   (2006.01)

(56) References Cited

U.S. PATENT DOCUMENTS

2007/0047073 A1  3/2007  Zimmer et al.
2011/0261445 A1  10/2011  Mizuta

FOREIGN PATENT DOCUMENTS

| DE | 102008041285 | 2/2010 |
| DE | 102011100997 | 11/2012 |
| GB | 2263344 | 7/1993 |

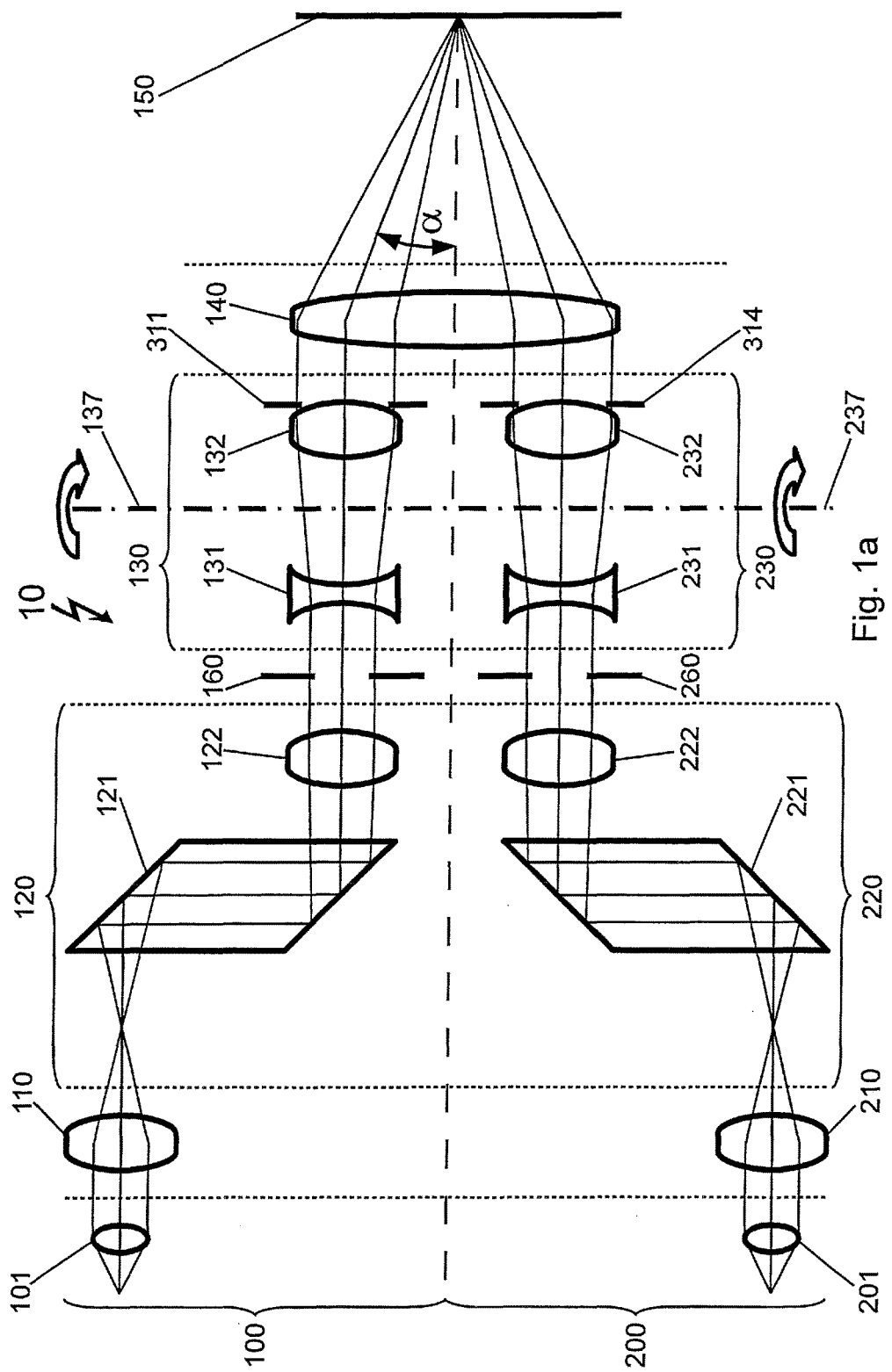

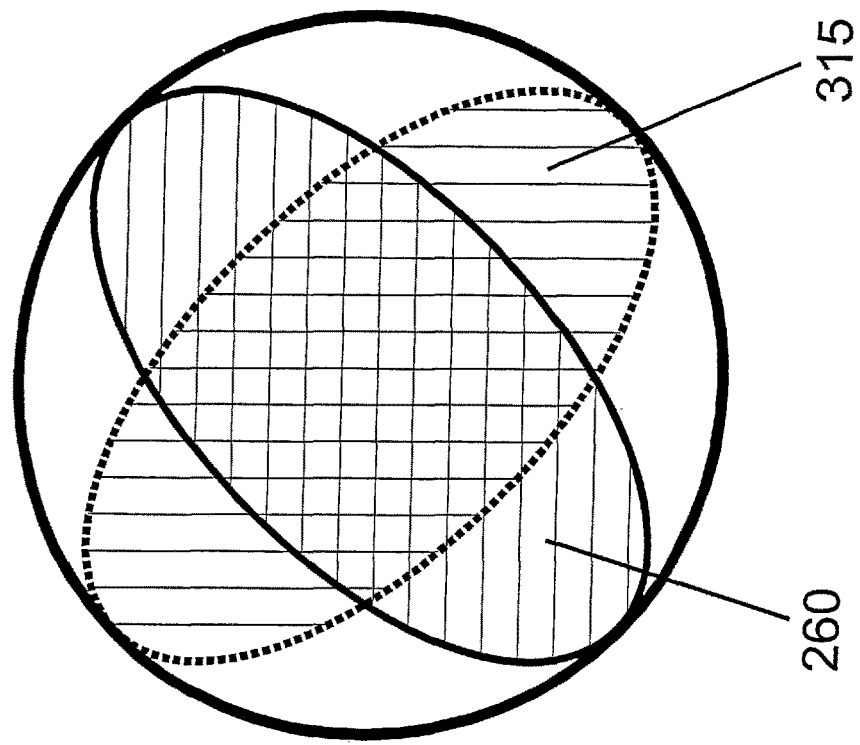
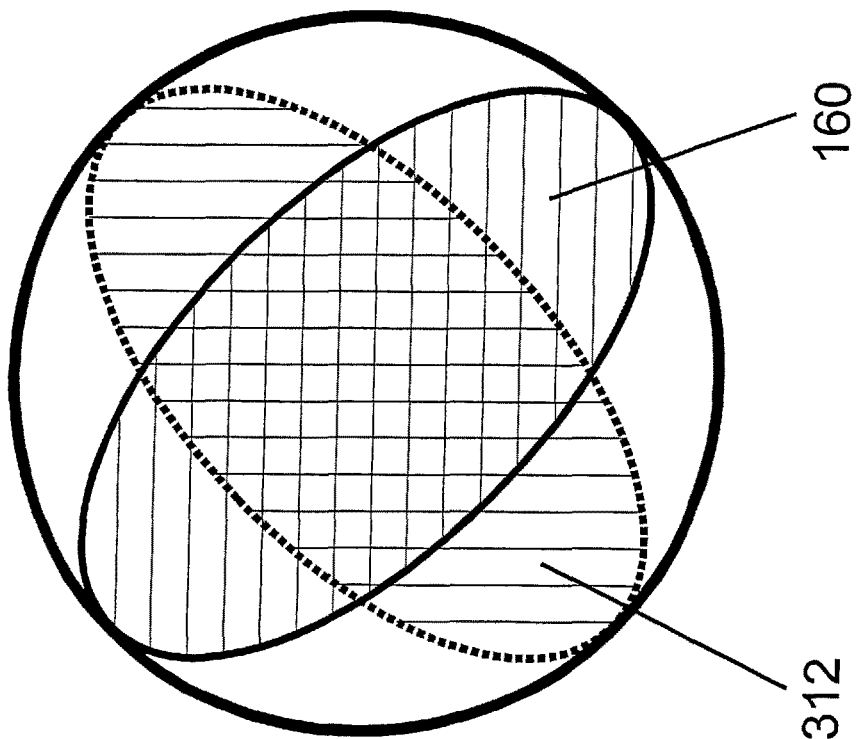
Fig. 9

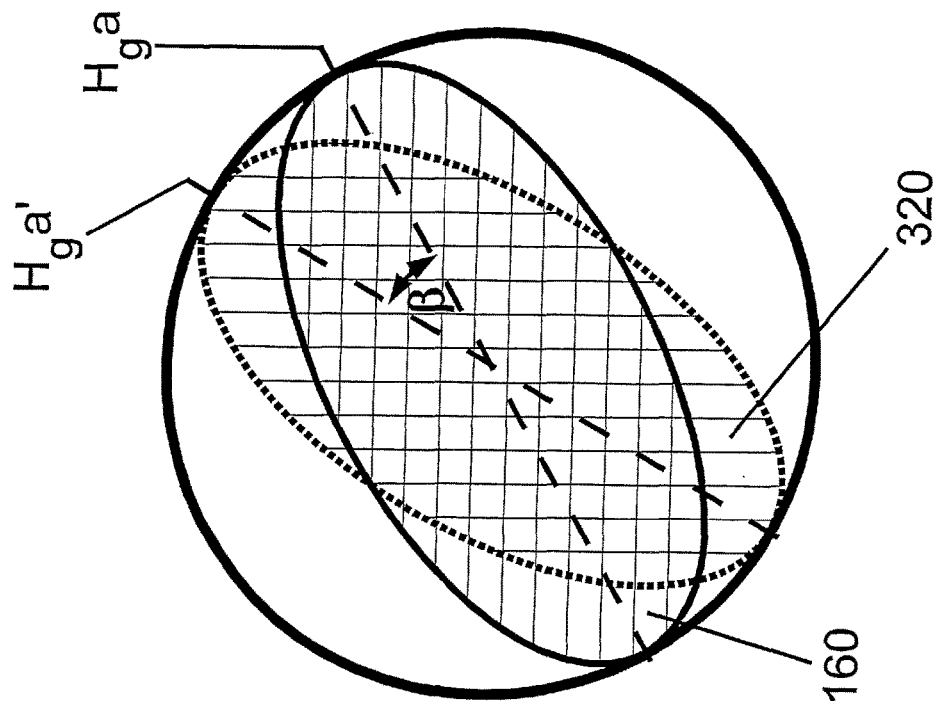
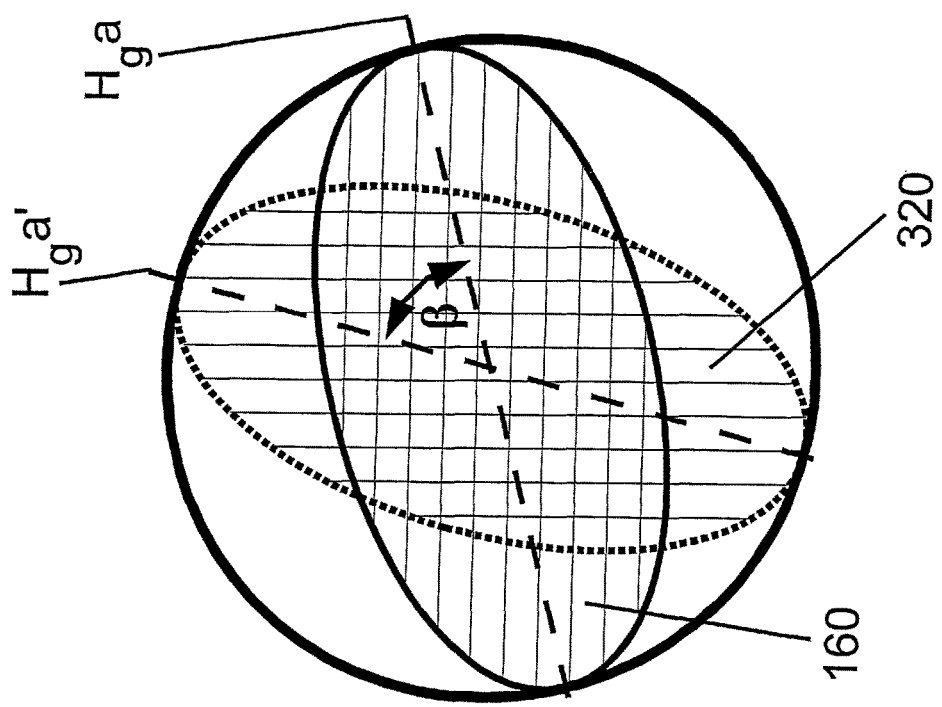

OPTICAL DEVICE FOR GENERATING WITH THREE-DIMENSIONAL EFFECT

CROSS REFERENCE TO RELATED APPLICATIONS

This application is a § 371 National Phase of PCT/EP2015/061448, filed May 22, 2015, the entirety of which is incorporated by reference and which claims priority to German Patent Application No. 10 2014 107 432.7, filed May 27, 2014.

BACKGROUND

The application relates to an optical device for generating images with a three-dimensional effect, having the features described herein.

Optical devices for generating images with a three-dimensional effect rely on the ability of the human brain for three-dimensional vision—that is, the ability of the human brain to fuse information from individual images together, and/or to analyze information fused from individual images in such a manner that a three-dimensional overall effect remains with the viewer.

In other words, such optical devices provide two observation channels with different optical properties, such as different optical paths, different light polarizations, and/or different colors of light, which provide the viewer with information from two different images of the observed object, perceived by the viewer's eyes, which then leads to a three-dimensional perception of the object. It is important in this case that information is fused together. This is done by the brain when the two eyes of a viewer can view the two observation channels at the same time—as is the case with a stereo microscope, for example.

However, the same effect can be achieved particularly with static or nearly static observation objects which do not move or which move slowly, if both observation channels are presented at different times rather than at the same, for example by very quickly switching between two observation channels, or by the fact that images of a first observation channel and images of a second observation channel are captured, for example by using a camera or video camera, and then fused together by—particularly electronic—image processing and observed in the fused state. Accordingly, the three-dimensional effect can be achieved as well for optical instruments which only have one observation channel at a given moment, such as a microscope or endoscope, if the optical properties of the first observation channel are variable—for example by the insertion of variable or interchangeable diaphragms used to influence the beam path, and/or variable or interchangeable filters used for influencing the polarization and/or color of the light. Attention should be directed at this point to the fact, explained in greater detail below, that it is also possible to define the effect of a diaphragm, an aperture or an opening in the beam path with a suitable combination and placement of polarization or color filters, which is why, in the context of this disclosure, the concept of a "diaphragm" also means appropriate combinations of polarization or color filters.

Perhaps the most common type of optical instruments for generating images with a three-dimensional effect are stereomicroscopes.

Stereomicroscopes form a subset of light microscopes, and are distinguished by the fact that they have at least partially different beam paths in the observation channels for the two eyes of a viewer, wherein stereomicroscopes of the Greenough type have one lens per observation channel, and stereomicroscopes of the Abbe type have a shared primary lens for both observation channels. The result of furnishing two observation channels with different beam paths is that the viewer's brain processes two different images, perceived by the viewer's eyes, of the object observed through the stereomicroscope, which leads to a three-dimensional perception of the object.

For this reason, stereomicroscopes are used in many areas in which objects are processed under a three-dimensional view—especially in medicine, where, among other things, they are used as surgical microscopes.

However, one problem of optical instruments for generating images with a three-dimensional effect, in general, and in particular stereomicroscopes, lies in the fact that the desired three-dimensional perception can only be realized if a sufficiently large depth of field is achieved. A small numerical aperture is needed for this purpose, which, in addition to darkening the image obtained, also limits the resolution which can be achieved—but reduces the cost of the microscope.

In contrast, when large numerical apertures are used, it is possible to obtain bright, high-resolution images—with highly complex optics and therefore high costs. However, with these conditions, the achievable depth of field—that is, the area in which an object is in focus—is low, and as a consequence the 3D effects disappear when the object is observed. For this reason, optical instruments for generating images with a three-dimensional effect, in particular stereomicroscopes, having high resolution, are nearly impossible to realize.

As mentioned above, the achievable depth of field can be increased by reducing the numerical aperture. For this reason, stereomicroscopes have already been developed in which the user can adjust the numerical aperture of the observation channels with adjustable diaphragms—for example in the form of iris diaphragms—which, if the adjustment is performed manually, may be forgotten upon a change of user, such that a later user then works under suboptimal conditions.

For this reason, DE 10 2004 006 066 B4, as one example, suggests providing a control unit for aperture diaphragms with adjustable size, said control unit automatically adjusting the size of the opening of the aperture diaphragm as a function of the selected observation parameters—in particular the selected magnification. However, such an automatic adjustment in practice usually does not lead to optimal observation experiences, which is ultimately due to the fact that the best adjustment of the microscope depends on the user's eyes, such that, although a standardized setting may avoid coarse adjustment errors, it also inhibits an individualized modification.

One interesting further approach for furnishing the desired depth of field is described by DE 10 2006 036 300 B4. This document suggests a different design of the two observation channels, in particular with regard to their numerical aperture, and relies on the brain's ability to combine the information from two different observation channels. The stereomicroscope described therein accordingly has one observation channel with a low numerical aperture, higher depth of field, and a dark image, which potentially also has a poorer resolution than the optical magnification would allow nominally, and one observation channel with a high numerical aperture, shallow depth of field, and high resolving power.

However, this solution involves a number of disadvantages. Firstly, cost advantages which are achieved by the substantially identical construction of two observation channels are lost.

Second, if the eyes of the user have different properties, the asymmetric system can lead to a situation in which the eye which is physiologically better-suited to the perception of high-resolution images is assigned to the observation channel with the lower numerical aperture, while the eye which is physiologically less suitable is assigned to the observation channel with a high numerical aperture.

Thirdly, there is a non-negligible risk that the significantly darker image of the channel with the smaller aperture is suppressed when the two images are fused in the mind of the viewer. In general, this phenomenon can be alleviated with a neutral gray filter in the observation channel with a high numerical aperture. However, this then largely cancels out the advantage of the brighter image representation.

SUMMARY

The problem addressed by the present disclosure is that of providing an improved optical instrument for generating images with a three-dimensional effect, particularly an improved stereomicroscope, by means of which it is possible to provide improved resolution at a given depth of field in a cost-effective manner.

This problem is addressed by an optical instrument for generating images with a three-dimensional effect. Advantageous implementations of the present disclosure are disclosed herein.

The optical device described herein for generating images with a three-dimensional effect has a first observation channel and a second observation channel which is present simultaneously or is alternated with the first observation channel in intervals. These observation channels can be constructed as is known from the prior art.

Typically, they each have—in the case of a stereomicroscope—an eyepiece, a lens tube system which can have, by way of example, a deflecting prism and one or more additional lenses, a magnification system which can be used to adjust the magnification of the stereomicroscope, which is generally designed in such a manner that the same magnification is necessarily set for both observation channels, and a lens which is included, for Greenough-type stereomicroscopes, in each observation channel, and which for Abbe-type stereomicroscopes is a shared lens for both observation channels.

The optical instrument for generating images with a three-dimensional effect can include a first diaphragm with a first aperture that is arranged in the first observation channel, said first aperture having a first semimajor axis, and a first semiminor axis which is perpendicular to the first semimajor axis, such that the extension of the first aperture in the direction of the first semimajor axis is greater than the extension of the first aperture in the direction of the first semiminor axis. The optical instrument can also include a second diaphragm having a second aperture that is arranged in the second observation channel, said second aperture having a second semimajor axis, and a second semiminor axis perpendicular to the second semimajor axis, such that the extension of the aperture in the direction of the second semimajor axis is greater than the extension of the aperture in the direction of the second semiminor axis, and that the first semimajor axis runs parallel to the second semiminor axis and the second semimajor axis runs parallel to the first semiminor axis.

In optical instruments in which the two observation channels are not furnished at the same time, but rather sequentially, this can be realized by exchanging the first diaphragm for the second diaphragm when the first and second observation channel are switched, which can be performed, for example, by moving the first diaphragm out of the beam path and moving the second diaphragm into the beam path, or by using a diaphragm which has a variable aperture and which can be adapted to the operation of the optical instrument with the other observation channel when the switch occurs.

It should be noted at this point that the aperture need not necessarily have a sharp transition to the region of the diaphragm which blocks the passage of light, as is the case with a simple pinhole. As such, it can also be realized by a gradient filter—for example, an apodization filter—inserted into the opening of a diaphragm, provided that the same defines an aperture which has the above-mentioned properties. An aperture can be defined as such by, for example, the number of points of a gradient filter where the same allows a transmittance above a certain threshold—for example >67%.

Also non-essential is the question of how and where the blocking effect of the region of the diaphragm which blocks the passage of light is achieved. For example, it is possible to realize a diaphragm and/or the region thereof which blocks the passage of light via the interaction of multiple polarization filters, or by the interactions of multiple color filters. This can be achieved, by way of example, by the light passing through this region being filtered with a prespecified polarization or wavelength distribution by a first polarization and/or color filter, which is then blocked in the further course of the beam path by a second polarization filter which is perpendicular to the first polarization filter, or by a second color filter with a passband for wavelengths which do not overlap the passband of wavelengths of the first color filter.

The term "semimajor axis," which is well known for ellipses, for example, is used in this disclosure in a generalizing sense to mean, for diaphragms with axially symmetric aperture, the longest connection between two edge points of the aperture located on a mirror axis of the aperture, while for diaphragms which have no mirror-symmetrical aperture, it means the longest connection between two edge points of the aperture. As is clear, this definition leads, for ellipses, to the same result as the use of the customary definition.

The "semiminor axis" in the context of this disclosure is then defined by the longest connection between two edge points of the aperture of a diaphragm, wherein said connection is perpendicular to the semimajor axis. This definition also leads, in the case of an elliptical aperture, to the same result as the use of the definition of the semiminor axis for an ellipse.

The inventive design of the optical instrument for generating images with a three-dimensional effect results in the effect that, in the two observation channels, the depth of field is different for different directions on the object, and specifically usually high in the direction of the semiminor axis of the aperture of the diaphragm, and low in the direction of the semimajor axis of the aperture of the diaphragm. However, because the semimajor axes of the apertures of the diaphragm which are arranged in the two observation channels are arranged perpendicular to each other, the depth of field in the direction in which it is not provided in the first observation channel is provided by the second observation channel. The two images are then combined in the brain of the viewer to form a complete image, which has a greater depth of field in the entire observation plane.

For example, an elliptical diaphragm with a semimajor axis running vertically to the object being observed leads, in the first observation channel, to an improved depth of field in the horizontal direction. Accordingly, the elliptical diaphragm in the second observation channel is arranged in such a manner that its semimajor axis extends horizontally to the object being observed, such that it produces an improved depth of field in the vertical direction. It turns out that the complete image which the brain of the viewer composes by combining the image information of the two observation channels then substantially corresponds to the image obtained when one works with high horizontal and vertical depth of field, but with lower brightness losses compared to this case. Of course, the first semimajor axis and the second semimajor axis need not necessarily be aligned vertically and horizontally in the image plane. In fact, it appears to be advantageous if the first semimajor axis and the second semimajor axis are oriented in the observation channels in such a manner that a St Andrew's Cross is obtained, rather than the cross which results from the horizontal/vertical orientation discussed above.

It is advantageous if a device for changing the numerical aperture of the observation channel is additionally included in at least one of the observation channels, because this can ensure that a viewer can further optimize the achievable depth of field. For example, an additional adjustable iris diaphragm can be used as such a device to reduce the numerical aperture.

It is particularly advantageous if the first aperture and the second aperture are congruent, because this makes it possible to achieve high image properties similarity for the individual images obtained from the two observation channels, especially as concerns their brightness, which facilitates their fusion in the brain.

A particularly preferred shape for the first aperture and the second aperture is that of an ellipse, because this shape achieves the best image properties for most applications. However, it is also possible to deviate from the elliptical shape, which may in particular entail a gain in brightness; however, especially with diaphragms having numerous corners, this can lead to unwanted spotlighting outside the focal point. This occurs in practice particularly frequently in surgical microscopes. As a result, such a solution is a compromise in which it is possible to optimize the brightness, but only at the expense of image quality.

The optimizing of the brightness of the images obtained is enhanced significantly if the length of the first semimajor axis and the length of the second semimajor axis each correspond to the free lens diameter of the lens which bounds the aperture in the parallel beam path between the lens and the lens tube system—for example, the converging lens of a Galilean magnification changer. In this context, experiments have shown a ratio of the first semimajor axis to the first semiminor axis, and/or a ratio of the second semimajor axis to the second semiminor axis, of 2:1, to be particularly advantageous.

Optical devices according to the present disclosure for generating images with a three-dimensional effect, in the form of stereomicroscopes, haven proven particularly successful. For this reason, it is particularly preferred that the optical device is a stereomicroscope having a first observation channel for one eye of a user, and a second observation channel for a second eye of the user.

One way to provide the stereomicroscope with a variable magnification is for the stereomicroscope to have a first pancratic zoom lens in the first observation channel as a magnification changer for varying the magnification of the stereomicroscope by changing the position of optical elements in the pancratic zoom lens, and a second pancratic zoom lens in the second observation channel for varying the magnification of the stereomicroscope by changing the position of optical elements in the pancratic zoom lens. In this case, the two pancratic zoom lenses can particularly be designed in such a manner that the same magnification is set on both at all times. The advantage of this type of magnification variation is that a stepless variation of magnification is possible.

In one advantageous implementation of the embodiment just described, the first observation channel and the second observation channel each have a further diaphragm, wherein the aperture of each is congruent with the aperture of the first diaphragm and/or congruent with the aperture of the second diaphragm, wherein the further diaphragms are each mounted rotatably about an axis which is perpendicular to their respective aperture and arranged in the center of the diaphragm, such that the angle between the semimajor axis of the aperture of the first diaphragm and the semimajor axis of the further diaphragm arranged in the first observation channel, and the angle between the semimajor axis of the aperture of the second diaphragm and the semimajor axis of the aperture of the further diaphragm arranged in the second observation channel, can be varied according to the set magnification.

This variability should also be embodied such that, at maximum magnification, the semimajor axis of the aperture of the further diaphragm arranged in the first observation channel runs parallel to the semimajor axis of the aperture of the first diaphragm and the semimajor axis of the aperture of the further diaphragm arranged in the second observation channel runs parallel to the semimajor axis of the aperture of the second diaphragm, while at minimum magnification, the semimajor axis of the aperture of the further diaphragm arranged in the first observation channel runs perpendicular to the semimajor axis of the aperture of the first diaphragm, and the semimajor axis of the aperture of the further diaphragm arranged in the second observation channel runs perpendicular to the semimajor axis of the aperture of the second diaphragm, and between these two values the angle between the corresponding semimajor axes varies between 0° at maximum magnification and 90° with minimum magnification.

Such a movement can be implemented in practice according to the selected magnification of a pancratic zoom lens by, for example, a mechanical control via shafts and/or gears, or by an electronic control, in which a position of the further diaphragm, and/or both diaphragms, is actuated by a motor.

Alternatively, a non-continuous, discrete variation of the magnification can be achieved by the stereomicroscope having a magnification changer which is designed as a rotatable drum with pairs of Galilean telescopes arranged to work in reverse configuration as well, with a converging lens and a diverging lens, such that by rotating the drum, another pair of Galilean telescopes can be rotated into each of the first and second observation channels. Since the at least one diverging lens and at least one converging lens of the Galilean telescopes are arranged on the drum for use in rotation, they increase the magnification when the converging lens faces the lens, and reduce the magnification when they are rotated 180° relative to this position—that is, are operated in the reverse orientation.

In this type of magnification changer, it is advantageous if further diaphragms with apertures each congruent to the aperture of the first diaphragm, and/or congruent to the aperture of the second diaphragm, are arranged on the converging lens of the paired Galilean telescopes.

In one preferred variant of the arrangement of the further aperture, in the position of the drum in which each pair of Galilean telescopes brought into the beam path of the stereomicroscope provides magnification (that is, the position in which the positive lens of the converging lens thereof faces the stereomicroscope), the semimajor axis of the aperture of the further aperture arranged in the first observation channel runs parallel to the semimajor axis of the aperture of the first diaphragm, and the semimajor axis of the aperture of the further diaphragm arranged in the second observation channel runs parallel to the semimajor axis of the aperture of the second diaphragm.

As a result, in the position in which the maximum magnification is set, the effective numerical aperture of the system is the greatest, such that the resolution which can be achieved with this magnification is as high as possible.

In contrast, in the position in which the Galilean telescope reduces size—that is, in a position in which the drum is rotated by 180° compared to the magnifying position in each observation channel, the semimajor axis of the aperture of the further diaphragm is at an angle of 90° to the semimajor axis of the first and/or second aperture, which results in the aperture being minimized, and thus the depth of field for small magnifications being maximized.

BRIEF DESCRIPTION OF THE DRAWINGS

The subject matter of the present application is explained below in greater detail by means of figures which illustrate embodiments designed as a stereo microscope, wherein:

FIG. 1a shows the schematic structure of a first embodiment,

FIG. 9 shows the position of the diaphragms in the observation channels of a stereo microscope, resulting from the arrangement shown in FIG. 7, FIG. 10a shows a first position of the diaphragms in the observation channels of a stereo microscope, resulting from a medium magnification level of a pancratic zoom lens, FIG. 10b shows a second position of the diaphragms in the observation channels of a stereo microscope, resulting from a magnification level of a pancratic zoom lens which is higher than the magnification level in FIG. 10a.

DETAILED DESCRIPTION

Figure 1B:
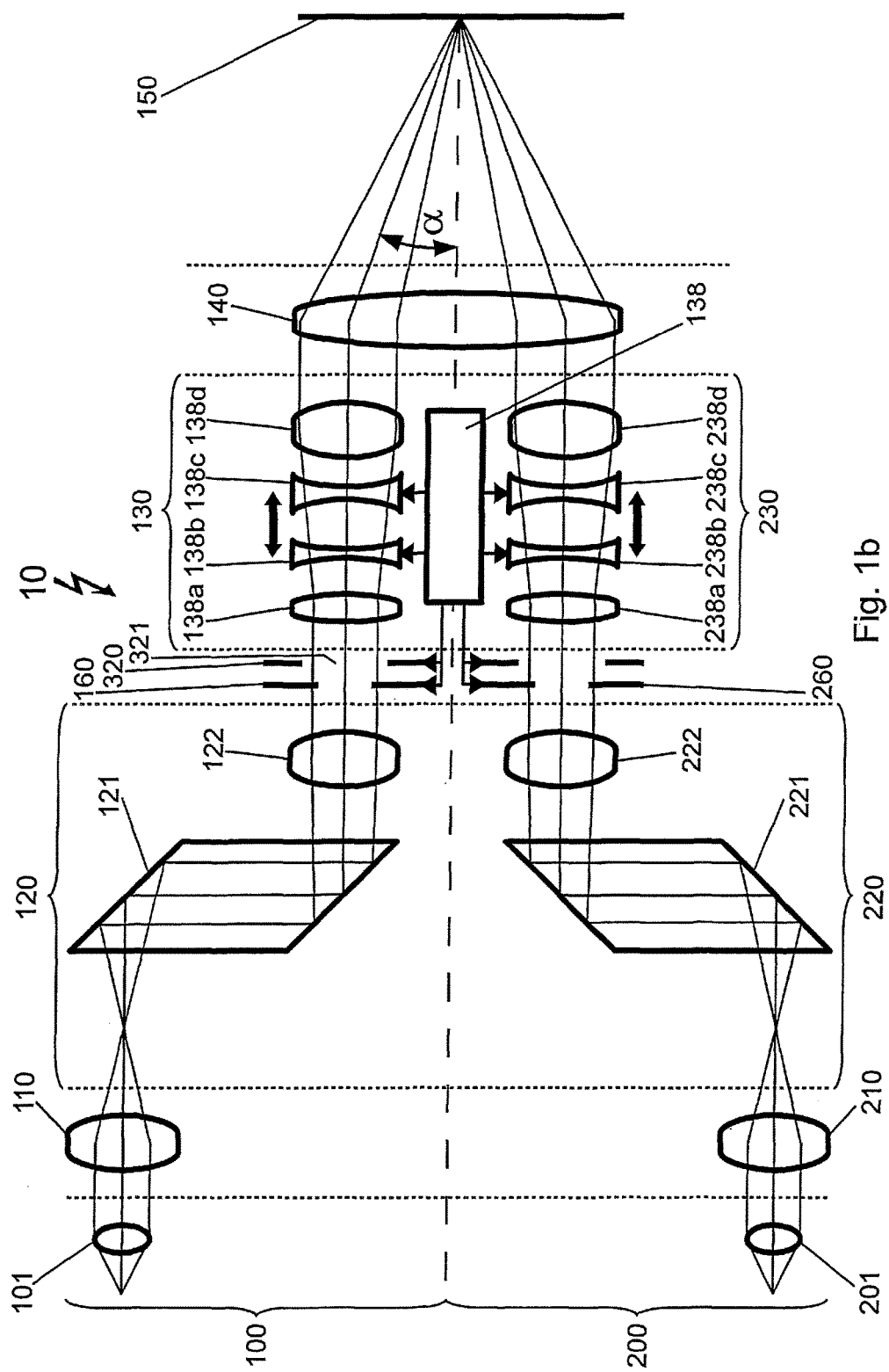
FIG. 1b shows the schematic structure of a second embodiment.

In the figures, the same reference numbers are used for components with the same construction, and/or identical assemblies, unless otherwise indicated.

Where beam paths are sketched in the figures, these only serve to illustrate the arrangement, and accordingly do not necessarily reflect the actual beam path. Rather, they may be illustrated with a deviation from the actual beam path in order to illustrate the principle clearly without overloading or excessive complication.

FIG. 1a shows schematically the construction of one embodiment, using the example of an Abbe-type stereomicroscope 10, as well as the beam path through the same. The optical components are only shown schematically, and can also have more complex, and optionally spatially separated, optical assemblies. For the completeness of illustration of the beam path, the eyes 101, 201 of the viewer are also shown in FIG. 1 as optical elements, which of course do not represent a component of the microscope.

The stereomicroscope 10 has a first observation channel 100 and a second observation channel 200. An eyepiece 110, an exemplary lens tube system 120 with a prism 121 and a tube lens 122, and a magnification changer 130 are arranged in the first observation channel 100.

In the illustration of FIG. 1a, the magnification changer 130 is illustrated with the design, as an example, of a drum with Galilean telescopes which can be operated in reverse configuration as well, which is the known arrangement of a negative lens and a positive lens. This is schematically illustrated by two lenses 131, 132, one of which diverges—that is, a "−" lens—and one of which converges—that is, a "+" lens—which are arranged in the beam path of the first observation channel 100, wherein these can be rotated out of the beam path by rotation about the rotational axis 137—in which case another, Galilean telescope, which is not illustrated in FIG. 1a, is rotated into the beam path. Further details regarding the construction of a magnification changer 130 designed as a drum are described below with reference to FIGS. 7 and 8.

The second observation channel 200 is constructed analogously, and includes an eyepiece 210, an exemplary tube lens system 220 with a prism 221 and a tube lens 222, and a magnification changer 230 designed as a drum, shown schematically as in the first observation channel by two lenses 231, 232 of a Galilean telescope arranged in the drum, and the axis of rotation 237. Light from points in the object plane 150 is directed into the first observation channel 100 and into the second observation channel 200 through the shared lens 140 at a stereo angle α, and generates two slightly different images in the eye 101, 102 of the viewer, which are processed into one image with a three-dimensional effect by the brain of the viewer.

The schematic structure described so far corresponds to a conventional structure of an Abbe-type stereomicroscope, as known from the prior art, and to a variety of other specific designs of stereomicroscopes, such as those available on the market from the Zeiss, Leica, and Atmos companies and other manufacturers, by way of example. The Greenough structure, which is not shown, differs only in that each of the two observation channels 100, 200 is assigned one lens, rather than sharing a shared lens 140, and the axes of the optical systems are inclined toward each other such that both eyes see the same object in the focal plane.

The stereomicroscope 10 can include, in addition to these standard components, a first diaphragm 160 in the first observation channel 100 and a second diaphragm 260 in the second observation channel 200, arranged by way of example between the tube lens system 120 and/or 220 and the magnification changer 130 and/or 230. However, these can be placed in other places in the parallel beam path between the lens and tube lens as well.

In this case, the apertures of the diaphragms 160/260 not visible in FIG. 1a are designed in such a manner that the first/second aperture of the first/second diaphragm 160/260 has a first/second semimajor axis, and a first/second semiminor axis perpendicular to the first/second semimajor axis, such that the extension of the first/second aperture is greater in the direction of the first/second semimajor axis than the extension of the first/second aperture in the direction of the first/second semiminor axis. In this manner, an anisotropic aperture is created which leads to a direction-dependent depth of field.

In addition, the orientation of the apertures 160, 260 relative to each other satisfies the condition that the first semimajor axis runs parallel to the second semiminor axis, and the second semimajor axis runs parallel to the first semiminor axis. This ensures that the improved depth of field is provided in the direction of the respective semimajor axis in perpendicular directions in the two observation channels 100, 200, such that the brain can combine this information from the eyes 101, 201 into a complete image with higher depth of field in the entire image plane.

Figure 2:
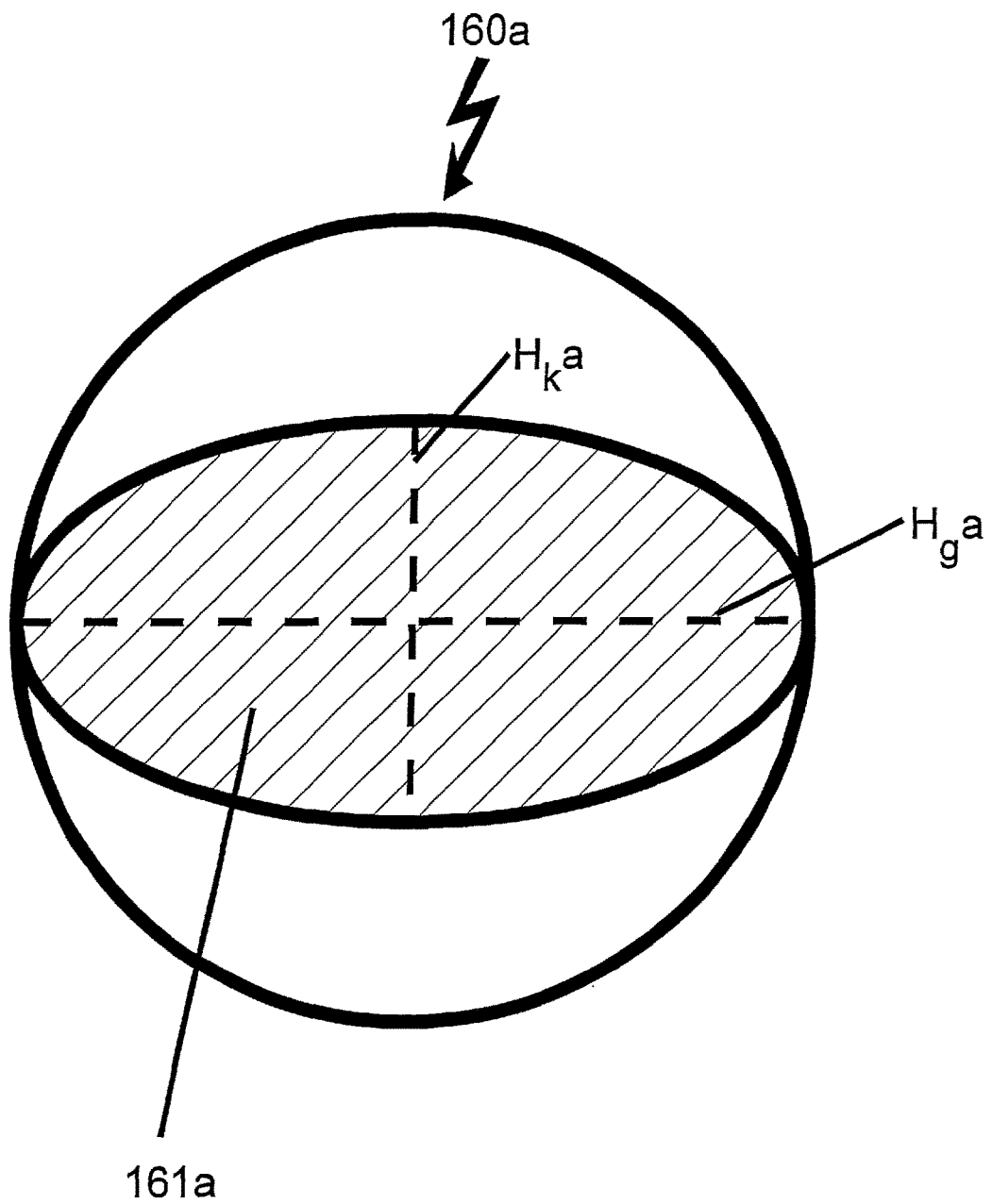
FIG. 2 shows a first example of the design of the aperture of a diaphragm.
Figure 3:
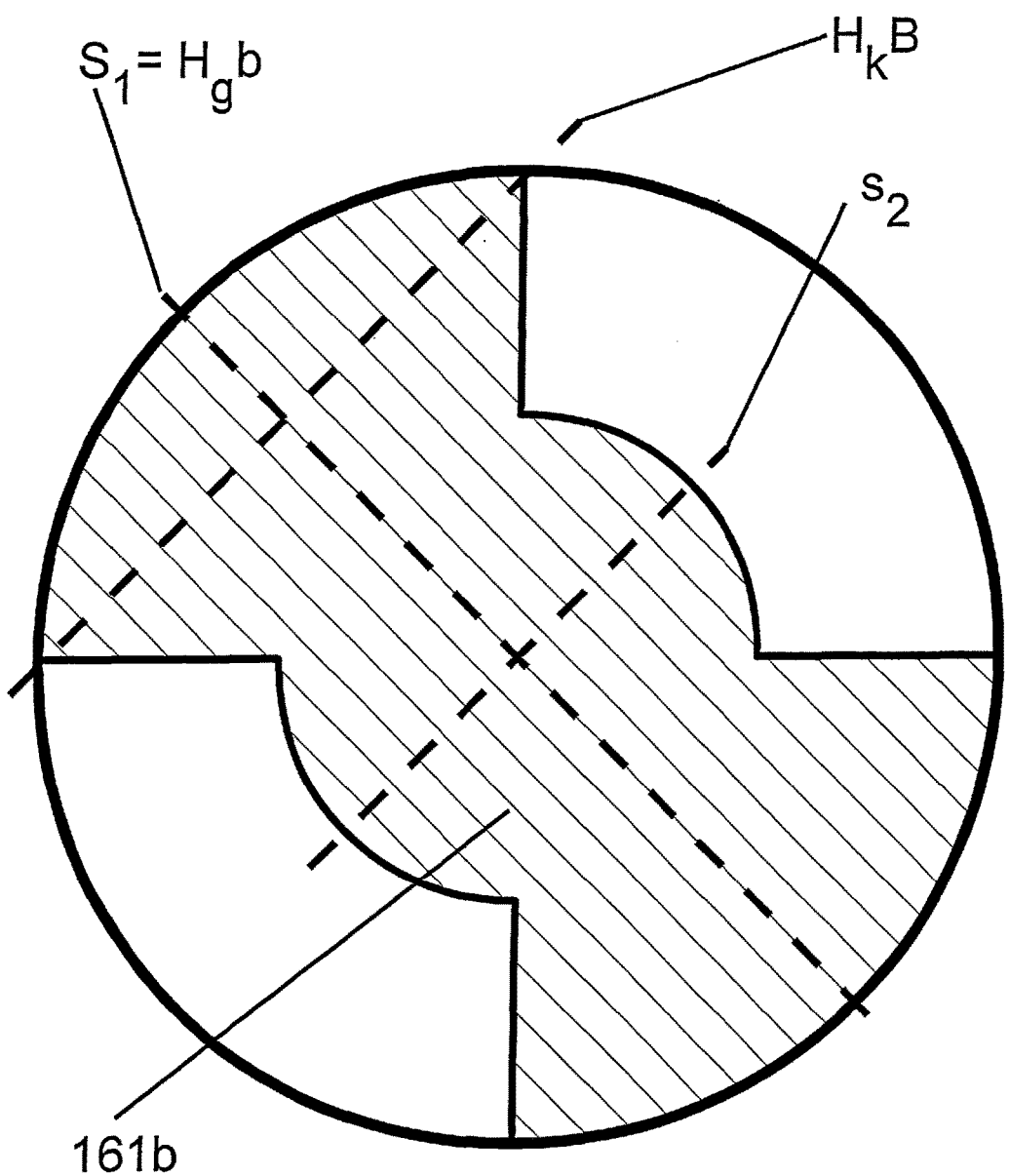
FIG. 3 shows a second example of the design of the aperture of a diaphragm.
Figure 4:
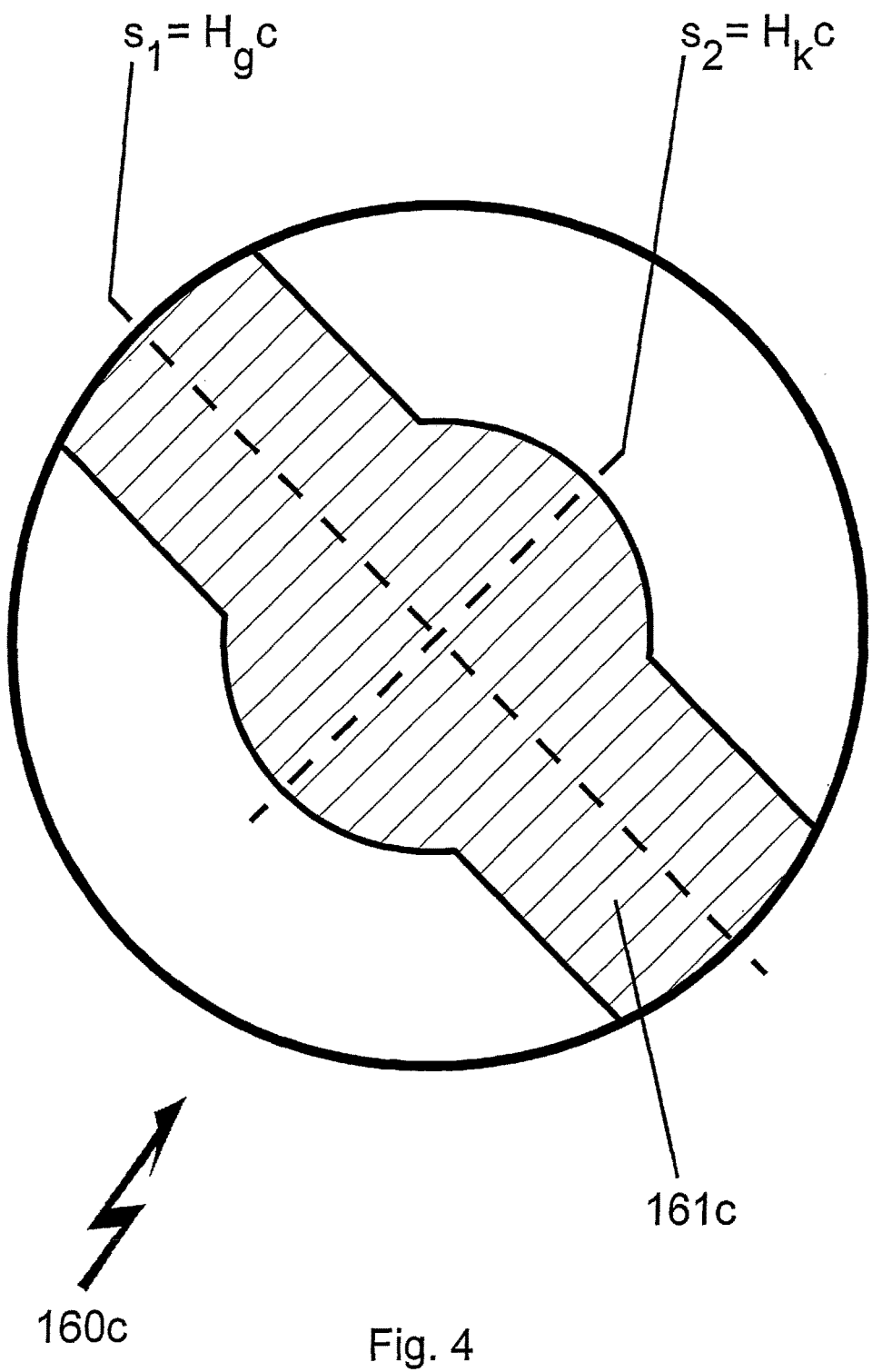
FIG. 4 shows a third example of the design of the aperture of a diaphragm.

Examples of diaphragms with apertures which satisfy the conditions for the diaphragms 160 and/or 260, and can therefore be used as diaphragm 160 and/or 260, are shown in FIGS. 2 to 4.

A further, optional component which can result in advantageous effects in the context of embodiments which have a magnification changer designed as a drum are the further apertures 311, 314 illustrated in Figure 1a, which are discussed in more detail below in the description of FIGS. 7 and 8.

The embodiment of a stereomicroscope 10 according to FIG. 1b differs from the embodiment shown in FIG. 1a only with regard to the concrete design of the magnification changer 130, which is designed in FIG. 1b as—again only schematically illustrated—a paired pancratic zoom lens, in which a control 138 mechanically—or by means of an electronic control of one or more drive devices, which are not illustrated—moves the position of lenses 138b, 138c and/or lenses 238b, 238c between lenses 138a, 138d and/or lenses 238a, 238d, in the first and second observation channel 100, 200, respectively, on the optical axis, and thereby changes the magnification. Of course, the type and number of the lenses can be variable. In particular, more lenses may be designed to be able to move axially.

In the embodiment shown in FIG. 1b, with a pancratic zoom, a further diaphragm 320 can also be arranged in the observation channels 100, 200, wherein the orientation thereof, and/or the orientation of the diaphragm 160, 260 in the respective observation channel 100, 200—that is, the direction in which the primary axes point into the apertures of the diaphragms—can likewise be influenced by the control 138. The effect of this measure is explained in more detail below with reference to FIGS. 10a and 10b.

Figure 1C:
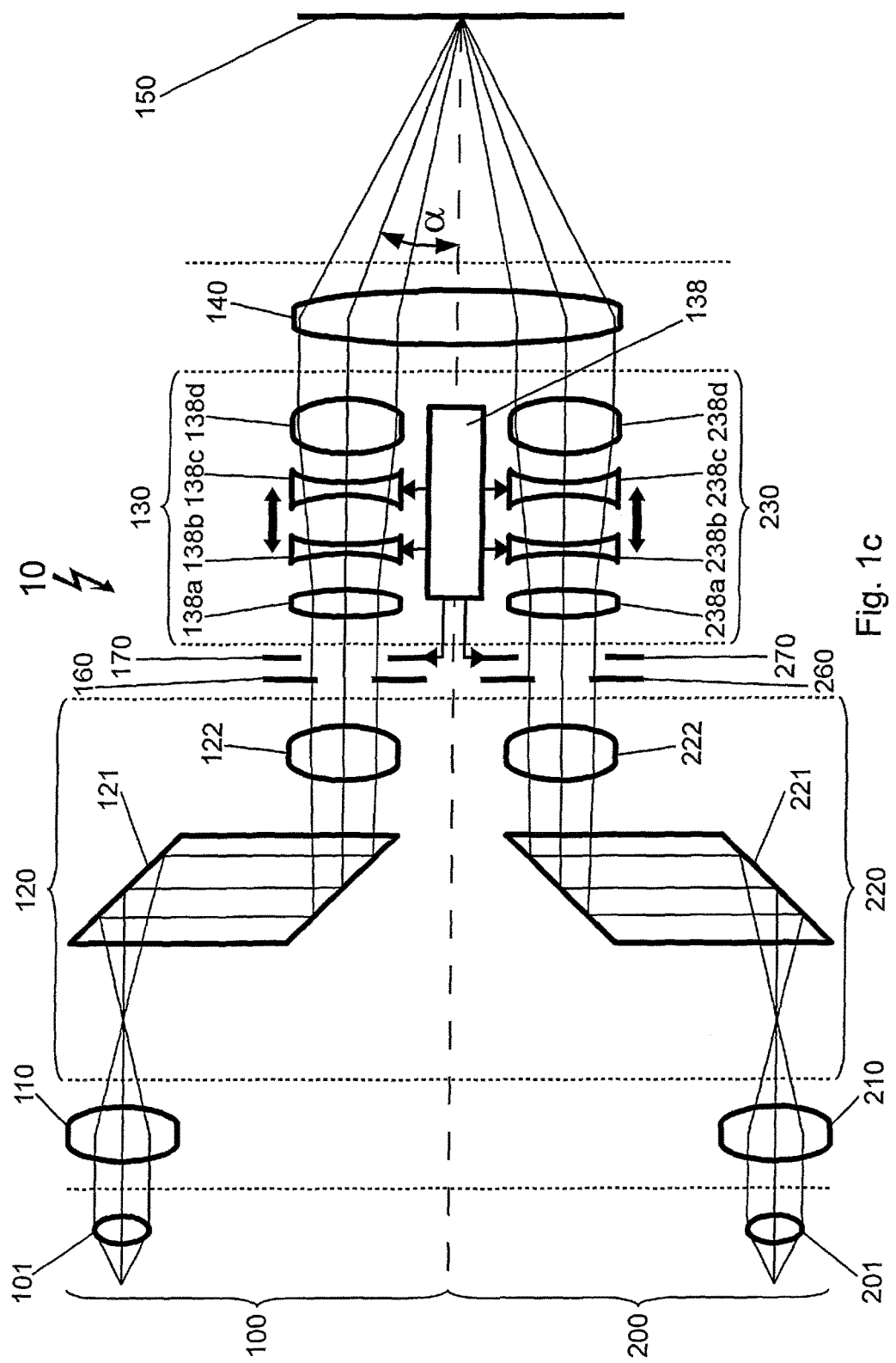
FIG. 1c shows the schematic structure of a third embodiment.

The embodiment of a stereomicroscope 10 according to FIG. 1c shows, like the embodiment according to FIG. 1b, a system in which the magnification changer 130 is designed as—again only schematically illustrated—a paired pancratic zoom lens, in which a control 138 mechanically—or by means of an electronic control of one or more drive devices, which are not illustrated—moves the position of lenses 138b, 138c and/or lenses 238b, 238c between lenses 138a, 138d and/or lenses 238a, 238d, in the first and second observation channel 100, 200, respectively, on the optical axis, and thereby changes the magnification. Of course, the type and number of the lenses can be variable. In particular, more lenses may be designed to be able to move axially.

The difference between the embodiment of FIGS. 1b and 1c is the way in which the numerical aperture of the observation channels can be influenced. While in the embodiment of FIG. 1b the aperture is varied by the rotation of two diaphragms relative to each other, in FIG. 1c adjustable iris diaphragms 170, 270 are arranged in the first and the second observation channels 100, 200. In the illustrated example, these are controlled by the control 138 as well, such that the pupil size of the adjustable iris diaphragms 170, 270 is adapted to the magnification set by the pancratic zoom. However, the adjustable iris diaphragms 170, 270 can also be designed to be individually adjustable by the user.

It is explicitly noted here that the provision of iris diaphragms 170, 270 as an additional optical component in the first and/or second observation channel 100, 200 is also possible in the embodiments of FIG. 1a and 1b.

FIG. 2 illustrates a diaphragm 160a with an elliptical aperture 161a with a semimajor axis $H_g a$ and a semiminor axis $H_k a$, wherein the semiaxes $H_g a$, $H_k a$, shown as dashed lines each correspond in this case directly to the common definition of semiaxes of an ellipse. The ratio $H_g a : H_k a$ in this example is 2:1. In FIG. 2, the free lens diameter d of the aperture-limiting lens, which is usually the converging lens of the magnification changer, is indicated by the circular ring. It is therefore evident that the length of the semimajor axis $H_g a$ corresponds in this case to the free lens diameter d.

The diaphragm 106b shown in FIG. 3 has an aperture 161b with a shape which corresponds to a central circle with two opposing circular ring sectors with the same angular region. The shape has two mirror axes s1 and s2, wherein the mirror axis s1 is longer than the mirror axis s2, and thus coincides with the semimajor axis $H_g b$. The semiminor axis $H_k b$ then corresponds to the longest straight line running perpendicular thereto. This shape of the aperture maximizes the achievable brightness of the image; however, due to its sharp points, it can result in spotlighting—perceived as unattractive—outside of the focal point. This is a particularly disruptive effect in surgical microscopes, but can and must be acceptable if it is otherwise not possible to achieve adequate brightness.

The diaphragm 160c shown in FIG. 4 has an aperture 161c with a shape which corresponds to a central circle with two opposing segments of a circular ring, with parallel—that is, in contrast to the embodiment of FIG. 3—rather than radial, lines of intersection. The shape has two mirror axes s1 and s2, wherein the mirror axis s1 is longer than the mirror axis s2 and thus coincides with the semimajor axis $H_g c$. The semiminor axis $H_k c$ then corresponds to the longest straight line running perpendicular thereto, and coincides with the axis of symmetry s2. The diaphragm 160c as well can have improved brightness compared to the brightness of the diaphragm 160a, even if not reaching the brightness of the diaphragm 160b, and noticeably reduces the "jaggedness" and thus the occurrence of unsightly spotlighting in relation to the diaphragm 160b.

Further effects resulting from this variation of the shape of the apertures 161a to c are discussed in more detail below in the context of the discussion of FIG. 7.

Figure 5:
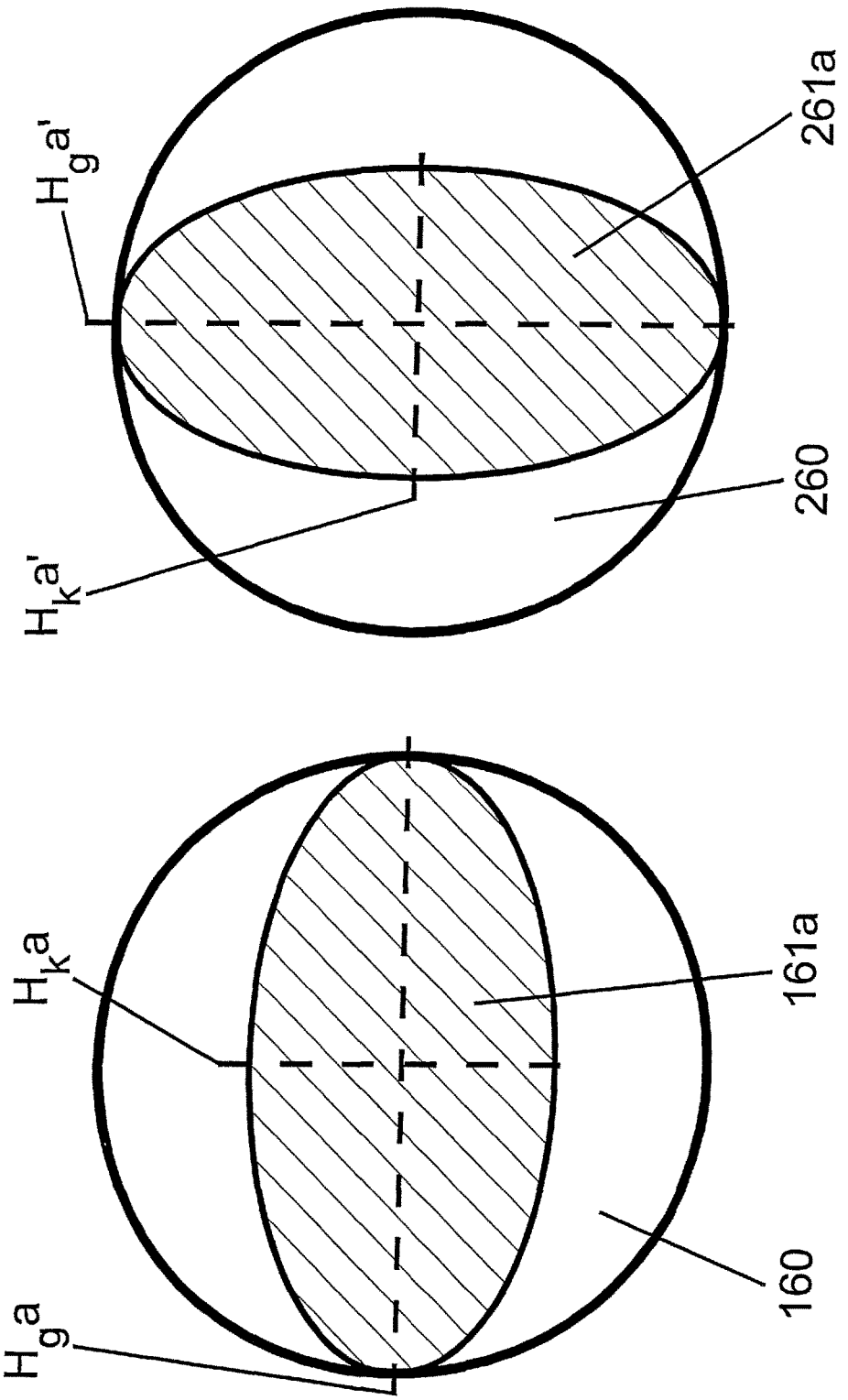
FIG. 5 shows a first arrangement of two elliptical diaphragms with semimajor axes which run perpendicular to each other, observed in the direction of light propagation.

FIG. 5 shows an example of how a first diaphragm 160 and a second diaphragm 260 are arranged in the light path of the stereomicroscope, specifically as viewed from the side of the user and/or the tube lens system. The diaphragms 160, 260 are each designed in the manner described with reference to FIG. 2, and therefore each have elliptical apertures 161a, 261a with semimajor axes $H_g a$, $H_g a'$ and semiminor axes $H_k a$, $H_k a'$ perpendicular thereto, and are particularly congruent. The first semimajor axis in this case—that is, the semiaxis $H_g a$ of the aperture 161a—runs parallel to the second semiminor axis—that is, the semiaxis $H_k a'$ of the second aperture 261a, and the second semimajor axis—that is, the semiaxis $H_g a'$ of the aperture 261a—runs parallel to the first semiminor axis—that is, the semiaxis $H_k a$ of the first aperture 161a.

This ensures that, in the two observation channels 100, 200, the improved depth of field is provided in the direction of the semiminor axis in mutually perpendicular directions, such that the brain can combine this information from the eyes 101, 201 into a complete image with higher depth of field in the entire image plane.

Figure 6:
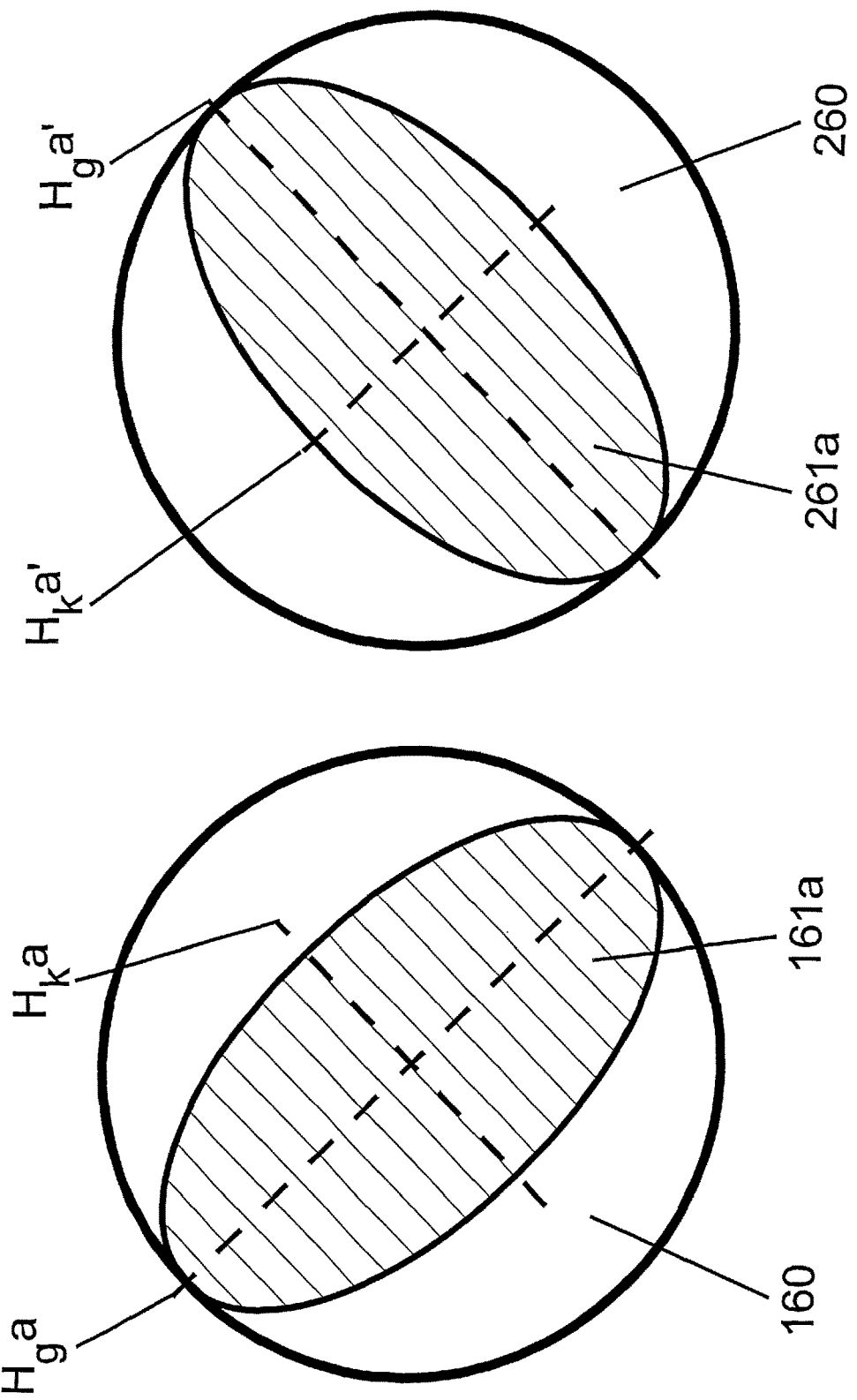
FIG. 6 shows a second arrangement of two elliptical diaphragms with semimajor axes which run perpendicular to each other, observed in the direction of light propagation.

FIG. 6 differs from FIG. 5 only with regard to the orientation of the diaphragms 160, 260. While in FIG. 5, the orientation of the diaphragms 160, 260 allows the semiaxes to run in the horizontal and vertical direction, the apertures 161, 261 of the diaphragms 160, 260 in FIG. 6 form the legs of a V. The effect which can be achieved with this preferred arrangement is particularly visible in the illustration of FIGS. 7 to 9.

Figure 7:
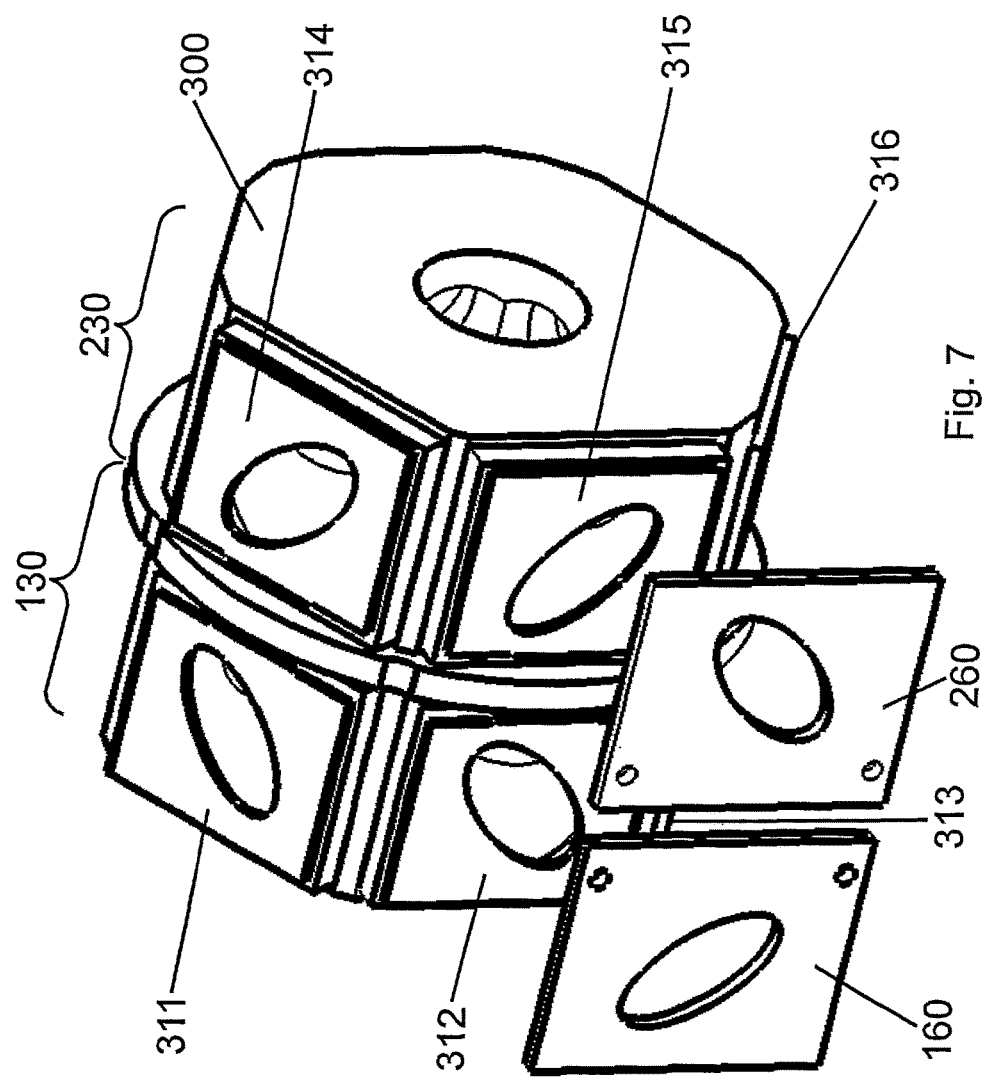
FIG. 7 shows a magnification changer designed as a drum with apertures, with pairs of Galilean telescopes arranged to work in reverse configuration as well, in an external view.
Figure 8:
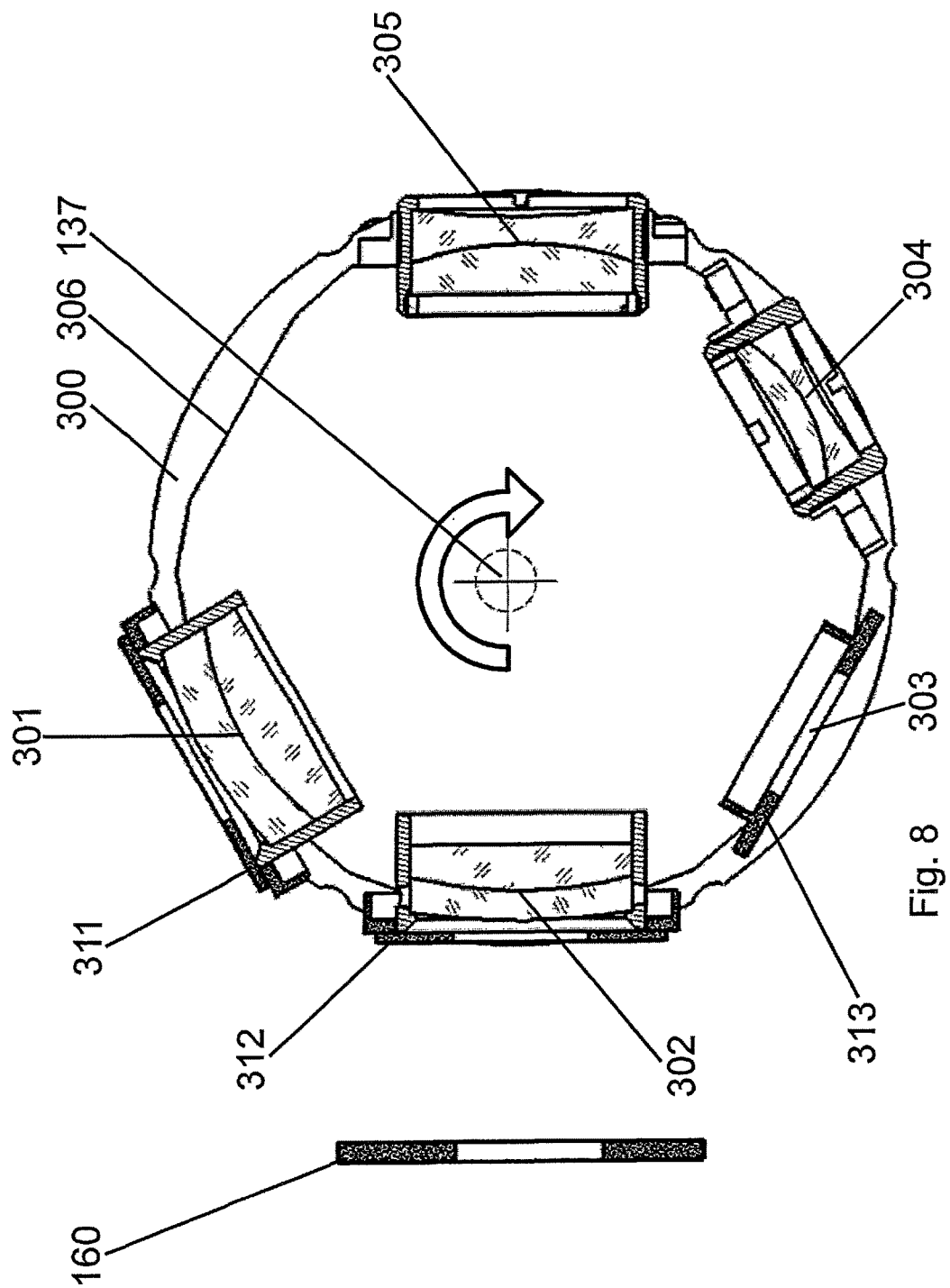
FIG. 8 shows a cutaway view of the magnification changer in FIG. 7, which gives a view of its inner construction.

FIGS. 7 and 8 show the construction of a magnification changer which is designed as a rotatable drum 300 with pairs of Galilean telescopes arranged to work in reverse configuration as well—that is, a possible construction of a magnification changer 130 in the design shown sketched in FIG. 1a.

FIG. 7 shows the exterior view of the magnification changer in the form of a rotatable drum 300, the left half of which represents the magnification changer 130, and the right half of which represents the magnification changer 230 in FIG. 1a.

As can be seen especially well in the sectional view in FIG. 8 of the plane lying perpendicular to the axis of rotation of the drum, in which the Galilean telescopes of one of the pairs lie, the half of the drum 300 in which the sectional plane lies and which forms the magnification changer 130 of the first observation channel 100 contains two converging lenses 301, 302 and two diverging lenses 304, 305, which are arranged in the edge of the drum 300, which has the shape of a cylinder jacket with openings for the respective lenses, in such a manner that in each case one converging lens 301, 302 and one diverging lens 304, 305 lying opposite thereto can be inserted together into the beam path of the stereomicroscope 10. The converging lens 301 and the diverging lens 304, and the converging lens 302 and the diverging lens 305, therefore each form a Galilean telescope, wherein the magnification of each Galilean telescope is determined by the properties of the lens pairs.

A third Galilean telescope with magnification 1 is realized by two opposed openings 303, 306 being included in the drum 300.

In addition, it can be seen that these Galilean telescopes can be operated in reverse configuration as well, which means that they can be operated in two orientations, namely with each converging lens 301, 302 adjacent to the lens 140, which is not illustrated in FIGS. 7 and 8, which leads to an increase in the total magnification of the stereomicroscope 10, and with the respective diverging lens 304, 305 adjacent to the lens, which is not illustrated in FIGS. 7 and 8, which leads to a reduction in the total magnification of the stereomicroscope 10. The Galilean telescope formed by the apertures 303, 306 can also be operated in reverse configuration as well, but always has the magnification 1. Overall, the magnification changer in this case is a five-fold magnification changer by means of which it is possible to set five magnifications.

As can be seen particularly well in FIG. 8, a further diaphragm 311, 312, 313 is attached to each of the converging lenses 301, 302 and/or the opening 303, each having an aperture which is congruent to the aperture of the first diaphragm 160 and second diaphragm 260 visible in FIG. 7, said aperture being designed as an ellipse and having a semimajor axis $H_g a$ and a semiminor axis $H_k a$.

The second half of the drum 300, which cannot be seen in FIG. 8, which forms the magnification changer 230 of the second observation channel, is constructed identically, including the orientation of the further diaphragms 314, 315, 316, included there, which are shown in FIG. 7.

In the illustration of FIG. 7, the converging lenses and/or openings of the Galilean telescopes covered by the further diaphragms 311, 312, 313, 314, 315, 316 face the first diaphragm 160 and/or the second diaphragm 260, and thus the associated diverging lenses face the lens 140, which is not shown in this case. The Galilean telescope in operation is therefore in the position which reduces the magnification of the stereomicroscope 10. The orientation of the further diaphragms 311 to 316 is selected in such a manner that the apertures in the illustrated, reducing position of the Galilean telescopes are each rotated 90° relative to the aperture of the associated diaphragm in the corresponding observation channel, and therefore the respective semiaxes $H_g a$, $H_k a$ of the apertures of the first/second diaphragm and the further diaphragms are perpendicular to each other on the drum 300.

The effect of this measure is illustrated in FIG. 9, in which the diaphragms 160 and 312, as well as 260 and 315, are illustrated superimposed on one another: At low magnification, the aperture of the stereomicroscope 10 is indicated by the cross-hatched area in FIG. 9, and is therefore smaller than the aperture of the diaphragm 160. This is advantageous because only at a sufficiently small aperture does the set magnification also lead to a corresponding improvement of the depth of field of the microscope. Due to the already low magnification, the smaller aperture has no negative impact on the achieved, still-visible resolution.

As can be easily envisioned when viewing FIG. 7, a rotation of the drum 300 by 180° brings the Galilean telescope into a position in which it increases the total magnification of the stereomicroscope 10, such that the diaphragms of the further diaphragms 311 through 316 positioned in the beam path are now oriented such that their apertures are oriented exactly like the apertures of the first diaphragm 160 and/or second diaphragm 260. As such, the entire ellipse is active in each case, which, as noted, is advantageous for the resolution in the direction of the semimajor axis.

As such, this arrangement results in the user of the stereomicroscope 10 automatically adjusting the aperture in the first observation channel 100 and the second observation channel 200 by selecting the magnification by means of adjusting the magnification changer 130, 230.

If, rather than the diaphragm with elliptical aperture illustrated in FIG. 2, the diaphragms illustrated in FIG. 3 or FIG. 4 are selected, the same effect results—with the difference that, when the Galilean telescope is set to a reducing position in the magnification changer, the effective aperture is circular, which in this case has a positive effect on the image properties, but which is "paid for" by poorer image properties in the magnifying position of the Galilean telescope in the magnification changer.

The same automatic adjustment effect can, as clarified in FIGS. 10a and 10b for the first observation channel 100, also be achieved in the case of a pancratic zoom lens if a further diaphragm 320 with an aperture 321 which is congruent to the aperture 161 of the first diaphragm 160 is also arranged, in addition to the first diaphragm 160, in the observation channel, and is able to move in such a manner that when the minimum magnification is set, the respective semiaxes $H_g a$ and $H_k a$ of the diaphragms 160 and 320 are perpendicular to each other, and when the maximum magnification is set, the respective semiaxes $H_g a$ and $H_k a$ of the diaphragms 160 and 320 are parallel to each other. As can be seen in FIGS. 10a and 10b, which show intermediate positions, the aperture of the system automatically increases with increasing magnification, while it decreases with decreasing magnification and thus improves the achievable resolution in the former case, and in the latter case increases the depth of field and thus the three-dimensional imaging.

LIST OF REFERENCE NUMBERS 10 stereo microscope
100 first observation channel
101, 201 eye of the viewer
110, 210 eyepiece
120, 220 lens tube system
121, 221 prism
122, 222 tube lens
130, 230 magnification changer
131, 132, 231, 232 lenses
137, 237 axis of rotation
138 control
138a to d lenses
140 shared lens
150 object plane
160, 160a, 160b, 160c diaphragm
161, 161a, 161b, 161c aperture
170, 270 adjustable iris diaphragm
200 second observation channel
238a to d lenses
260 second diaphragm
261, 261a aperture
300 drum
301, 302 converging lenses
304, 305 diverging lenses
303, 306 opening
311, 312, 313, 314,
315, 316, 320, 321 further diaphragm
α stereo angle
β angle
$H_g$, $H_g a$, $H_g b$, $H_g c$ semimajor axis
$H_g'$, $H_g a'$, $H_g b'$, $H_g c'$ semimajor axis
$H_k$, $H_k a$, $H_k b$, $H_k c$ semiminor axis
$H_k'$, $H_k a'$, $H_k b'$, $H_k c'$ semiminor axis
s1, s2 mirror axis

The invention claimed is:

1. An optical device for generating images, comprising:
a first observation channel;
a second observation channel which can be present simultaneously, or alternated in intervals, with the first observation channel;
a first diaphragm arranged in the first observation channel and having a first aperture, wherein the first aperture comprises:
  a first semimajor axis ($H_g a$, $H_g b$, $H_g c$); and
  a first semiminor axis ($H_k a$, $H_k b$, $H_k c$) perpendicular to the first semimajor axis ($H_g a$, $H_g b$, $H_g c$), such that an extension of the first aperture in a direction of the first semimajor axis ($H_g a$, $H_g b$, $H_g c$) is greater than an extension of the first aperture in a direction of the first semiminor axis ($H_k a$ $H_k b$, $H_k c$),
a second diaphragm arranged in the second observation channel and having a second aperture, wherein the second aperture comprises:
  a second semimajor axis ($H_g a'$, $H_g b'$, $H_g c'$); and
  a second semiminor axis ($H_k a'$, $H_k b'$, $H_k c'$) which is perpendicular to the second semimajor axis ($H_g a'$, $H_g b'$, $H_g c'$), such that an extension of the second aperture in a direction of the second semimajor axis ($H_g a'$, $H_g b'$, $H_g c'$) is greater than an extension of the aperture in a direction of the second semiminor axis ($H_k a'$, $H_k b'$, $H_k c'$), and
wherein the first semimajor axis ($H_g a$, $H_g b$, $H_g c$) runs parallel to the second semiminor axis ($H_k a'$, $H_k b'$, $H_k c'$), and the second semimajor axis ($H_g a'$, $H_g b'$, $H_g c'$) runs parallel to the first semiminor axis ($H_k a$, $H_k b$, $H_k c$).

2. The optical device for generating images according to claim 1,
wherein the first aperture and the second aperture are congruent.

3. The optical device for generating images according to claim 1,
wherein the first aperture and the second aperture each have the shape of an ellipse.

4. The optical device for generating images according to one of the claim 1,
wherein a length of the first semimajor axis ($H_g a$, $H_g b$, $H_g c$) and a length of the second semimajor axis ($H_g a'$, $H_g b'$, $H_g c'$) each correspond to a free lens diameter (d).

5. The optical device for generating images according to one of the claim 1,
wherein a ratio of the first semimajor axis ($H_g a$, $H_g b$, $H_g c$) to the first semiminor axis ($H_k a$, $H_k b$, $H_k c$) is 2:1.

6. The optical device for generating images according to claim 1,
wherein the first observation channel is arranged for a first eye of a user, and the second observation channel is arranged for a second eye of the user such as to provide a stereo microscope.

7. The optical device for generating images according to claim 6,
further comprising:
a magnification changer which is designed as a rotatable drum with pairs of Galilean telescopes arranged to work in reverse configuration, having a converging lens and a diverging lens such that when the drum rotates, another pair of Galilean telescopes can be rotated into the first observation channel and the second observation channel.

8. The optical device for generating images according to claim 7,
further comprising a converging aperture arranged in such a manner on the converging lens of the paired Galilean telescopes, and in that when the drum is in a position in which each pair of Galilean telescopes inserted into a beam path of the optical device magnifies, the semimajor axis of the converging aperture of the converging diaphragm arranged in the first observation channel runs parallel to the semimajor axis of the first aperture of the first diaphragm, and the semimajor axis of the converging aperture of the converging diaphragm arranged in the second observation channel runs parallel to the semimajor axis of the second aperture of the second diaphragm.

9. The optical device for generating images according to claim 7,
further comprising an opening diaphragm with an opening aperture arranged in such a manner on an opening of the paired Galilean telescopes, and in that when the drum is in a position in which each pair of Galilean telescopes inserted into a beam path of the optical device magnifies, the semimajor axis of the opening aperture of the opening diaphragm arranged in the first observation channel runs parallel to the semimajor axis of the first aperture of the first diaphragm, and the semimajor axis of the opening aperture of the opening diaphragm arranged in the second observation channel runs parallel to the semimajor axis of the second aperature of the second diaphragm.

10. The optical device for generating images according to claim 1,
wherein the first observation channel further comprises:
a first magnification changer; and
a first pancratic zoom lens for varying magnification of the optical device by changing a position of an optical element in the pancratic zoom lens, and
wherein the second observation channel further comprises:
a second magnification changer; and
a second pancratic zoom lens for varying magnification of the optical device by changing the position of an optical element in the pancratic zoom lens.

11. The optical device for generating images according to claim 1,
further comprising:
a secondary-first diaphragm with a secondary-first aperture included in the first observation channel;
a secondary-second diaphragm with a secondary-second aperture included in the second observation channel, wherein the secondary-first aperture and the secondary-second aperture are congruent to the first aperture of the first diaphragm,
wherein the secondary-first diaphragm is rotatably mounted about an axis which is perpendicular to the secondary-first aperture and arranged at the center of the secondary-first aperture,
wherein the secondary-second diaphragm is rotatable mounted about an axis which is perpendicular to the secondary-second aperture and arranged at the center of the secondary-second aperture,
such that an angle ($\beta$) formed by the semimajor axis of the first aperture of the first diaphragm and a semimajor axis of the secondary-first aperture of the secondary-first diaphragm arranged in the first observation channel, and an angle formed by the semimajor axis of the second aperture of the second diaphragm and a semimajor axis of the secondary-second aperture of the secondary-second diaphragm arranged in the second observation channel can be modified in such a manner that:
at a maximum magnification, the semimajor axis of the secondary-first aperture of the secondary-first diaphragm arranged in the first observation channel runs parallel to the semimajor axis of the first aperture of the first diaphragm, and the semimajor axis of the secondary-second aperture of the secondary-second diaphragm arranged in the second observation channel runs parallel to the semimajor axis of the second aperture of the second diaphragm and,
at a minimum magnification, the semimajor axis of the secondary-first aperture of the secondary-first diaphragm arranged in the first observation channel runs perpendicular to the semimajor axis of the first aperture of the first diaphragm, and the semimajor axis of the secondary-second aperture of the secondary-second diaphragm arranged in the second observation channel runs perpendicular to the semimajor axis of the second aperture of the second diaphragm.

12. The optical device for generating images according to one of the claim 1,
wherein a ratio of the second semimajor axis ($H_g a'$, $H_g b'$, $H_g c'$) to the second semiminor axis ($H_k a'$, $H_k b'$, $H_k c'$) is 2:1.

* * * * *